United States Patent [19]

Welles, II et al.

[11] Patent Number: 5,585,566
[45] Date of Patent: Dec. 17, 1996

[54] LOW-POWER SHOCK DETECTOR FOR MEASURING INTERMITTENT SHOCK EVENTS

[75] Inventors: Kenneth B. Welles, II, Scotia; Daniel D. Harrison, Delanson, both of N.Y.

[73] Assignee: General Electric Company, Schenectady, N.Y.

[21] Appl. No.: 300,890

[22] Filed: Sep. 6, 1994

[51] Int. Cl.$^6$ ............................................. G01P 15/08
[52] U.S. Cl. ........................... 73/654; 73/510; 73/514.35; 340/669; 340/683; 340/436; 340/690; 340/566; 340/429; 331/64
[58] Field of Search ................... 73/517 R, 522, 73/654, 510, 514.35, 509, 652; 340/669, 690, 566, 429, 683, 636, 436; 331/64

[56] References Cited

U.S. PATENT DOCUMENTS

| | | | |
|---|---|---|---|
| 1,915,267 | 7/1933 | Bigelow . | |
| 3,176,518 | 4/1965 | Morris et al. | 73/517 R |
| 3,197,756 | 7/1965 | Maynard | 73/517 R |
| 3,251,009 | 5/1966 | Hunter | 73/654 |
| 3,329,935 | 7/1967 | Wiggins | 340/429 |
| 3,448,621 | 6/1969 | Magda et al. | 73/517 R |
| 3,455,148 | 7/1969 | Foster et al. | 73/517 R |
| 3,611,323 | 10/1971 | Goto et al. | 340/173 MS |
| 3,619,524 | 11/1971 | Gillund | 200/61.45 |
| 3,668,675 | 6/1972 | Joens et al. | 340/224 |
| 3,715,533 | 2/1973 | Seaton | 340/429 |
| 3,750,100 | 7/1973 | Ueda | 340/436 |
| 3,763,484 | 10/1973 | Byers | 340/669 |
| 3,774,128 | 11/1973 | Orlando | 340/669 |
| 3,831,163 | 8/1974 | Byers | 340/669 |
| 3,863,497 | 2/1975 | van de Vaart et al. | 73/517 R |
| 3,921,014 | 11/1975 | Jayne | 73/517 R |
| 3,940,636 | 2/1976 | Perahia | 73/517 R |
| 3,949,357 | 4/1976 | Hosaka | 340/436 |
| 3,975,722 | 8/1976 | Adler et al. | 340/429 |
| 4,017,811 | 4/1977 | Lindsay et al. | 333/30 M |
| 4,019,389 | 4/1977 | LaSala et al. | 73/522 |
| 4,057,791 | 11/1977 | Bimmerle et al. | 340/429 |
| 4,060,004 | 11/1977 | Scholz et al. | 340/436 |
| 4,103,284 | 7/1978 | Blake | 340/436 |
| 4,156,865 | 5/1979 | Lovell et al. | 340/436 |
| 4,237,446 | 12/1980 | Roberts | 340/436 |
| 4,359,717 | 11/1982 | Huber et al. | 73/654 |
| 4,390,862 | 6/1983 | Elks | 340/436 |
| 4,395,651 | 7/1983 | Yamamoto | 310/317 |
| 4,467,235 | 8/1984 | De Wames et al. | 73/517 R |
| 4,584,569 | 4/1986 | Lopez et al. | 73/654 |
| 4,684,928 | 8/1987 | Takahashi et al. | 340/436 |
| 4,726,627 | 2/1988 | Frait et al. | 73/517 R |
| 4,797,661 | 1/1989 | Wiley | 73/654 |
| 5,012,222 | 4/1991 | Gavrilis | 340/436 |
| 5,045,834 | 9/1991 | Hutchcraft | 340/436 |
| 5,121,100 | 6/1992 | Gallo | 340/669 |
| 5,227,785 | 7/1993 | Gann et al. | 340/436 |
| 5,276,426 | 1/1994 | LoBello | 340/436 |
| 5,283,472 | 2/1994 | Takeuchi et al. | 340/436 |
| 5,408,214 | 4/1995 | Chalmers et al. | 340/436 |

*Primary Examiner*—Hezron E. Williams
*Assistant Examiner*—Richard A. Moller
*Attorney, Agent, or Firm*—Marvin Snyder

[57] ABSTRACT

A shock detector for measuring intermittent shock events comprises a mechanical delay line to supply delayed output motion in response to input motion along an input axis. A transducer converts the delayed output motion to an electrical signal representative of the delayed output motion. The transducer is generally in a respective inactive state to reduce the power consumption of the shock detector. A relatively low power motion sensor, such as low power accelerometer or tilt actuated switch, is employed for switching the transducer to a respective active state in response to the input motion thereby allowing the shock detector to measure any intermittent shock event regardless of the generally inactive state of the transducer.

10 Claims, 5 Drawing Sheets

LOW-POWER SHOCK DETECTOR FOR MEASURING INTERMITTENT SHOCK EVENTS

BACKGROUND OF THE INVENTION

The present invention relates to shock detectors and, more particularly, to a low-power shock detector for measuring intermittent shock events.

A significant requirement for mobile tracking units used in vehicles which generally lack a power source, such as freight railcars, shipping containers and the like, is to have relatively low electrical power consumption characteristics. Mobile tracking units used in a power-starved environment must be substantially power efficient in order to provide reliable and economical operation. Typically, the mobile tracking unit includes a navigation set, such as a Global Positioning System (GPS) receiver or other suitable navigation set, responsive to navigation signals transmitted by a set of navigation stations which can be either space- or earth-based. In each case, the navigation set is capable of providing data indicative of the vehicle location based on the navigation signals. In addition, the mobile tracking unit can include a suitable electromagnetic emitter for transmitting to a remote location the vehicle position data and other data acquired with sensing elements in the vehicle. For presently available mobile tracking units, use of a motion sensor, such as an accelerometer or shock detector, has been suggested for detecting shock or impact events which the vehicle encounters during routine use. However, no suggestion has been made of techniques for substantially reducing the power consumption of such shock detector. Thus, it is desirable to provide an improved shock detector that allows for economical and reliable operation in a power-starved environment. It is also desirable to provide a shock detector that, notwithstanding its relatively low-power consumption over presently available shock detectors, is capable of measuring any shock event in a substantially accurate manner in order to provide to users meaningful information about the shock events.

SUMMARY OF THE INVENTION

Generally speaking, the present invention fulfills the foregoing needs by providing a shock detector for measuring intermittent shock events. The shock detector comprises a mechanical delay line, such as a torsional mechanical delay line or a spring and the like, to supply delayed output motion in response to input motion along a predetermined input motion axis. A transducer, such as a potentiometer or an electromagnetic transducer, is coupled to the mechanical delay line for converting the delayed output motion to an electrical signal representative of the delayed output motion. The transducer is generally in a respective inactive state to reduce the power consumption of the shock detector. Motion sensing means, such as an accelerometer or shock sensor, is employed for switching the transducer to a respective active state in response to the input motion thereby allowing the shock detector to substantially measure any intermittent shock event regardless of the generally inactive state of the transducer.

In an alternative embodiment, an accelerometer can be employed to produce a substantially accurate acceleration output signal after a predetermined stabilization time passes upon the accelerometer being turned on. In this alternative embodiment, the accelerometer is activated by a timer to have a predetermined duty cycle sufficient to further reduce power consumption therein. The timer can also switch the transducer to a respective active state thereby allowing said transducer to measure at least an initial portion of the shock event and allowing the accelerometer to accurately measure any remaining portion of the shock event.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like numbers represent like pans throughout the drawings, and in which:

DETAILED DESCRIPTION OF THE INVENTION

The present invention advantageously provides an improved shock detector capable of measuring intermittent shock events in a power starved environment.

Figure 1:
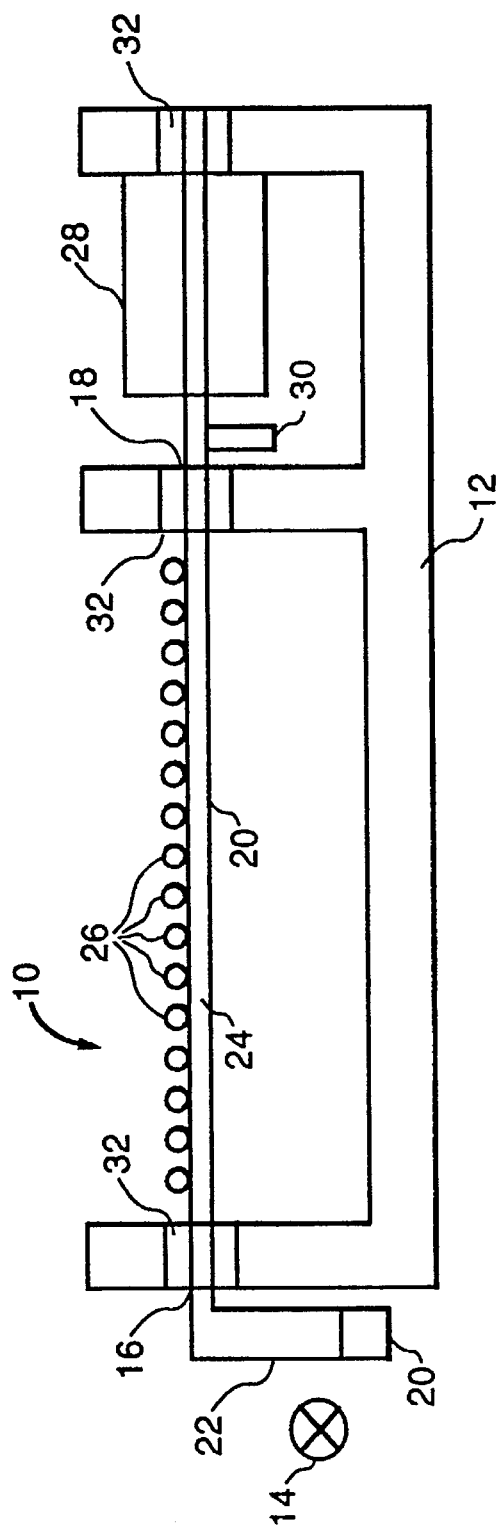
FIG. 1 is a side schematic view of a torsional mechanical delay line including an exemplary transducer in accordance with one embodiment of the present invention.
Figure 2:
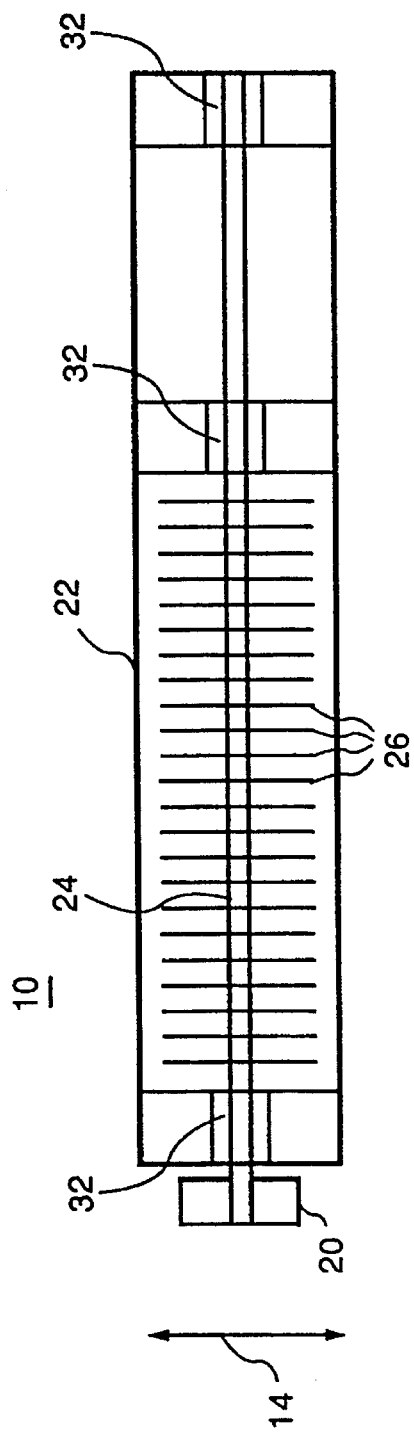
FIG. 2 is a side schematic view of the torsional mechanical delay line shown in FIG. 1.

FIG. 1 shows a side schematic view of a mechanical delay line, such as a torsional mechanical delay line 10 mounted on a platform 12. The mechanical delay line supplies delayed output motion in response to input motion along a predetermined input motion axis (e.g., axis 14). As used herein input motion refers to motion resulting from acceleration or shock sensed along the input axis. As shown in FIG. 1, torsional delay line 10 has opposite ends 16 and 18 positioned, for example, substantially perpendicular to the predetermined input motion axis. A predetermined inertial mass 20 is attached to first end 16 via a connecting arm 22 so that input motion along axis 14 propagates through rod 24 with a predetermined propagation speed toward second end 18. Rod 24 preferably includes a plurality of cross-bars 26 attached, for example, at respective right angles to rod 24, as best seen in FIG. 2. The size and number of cross-bars 26 conveniently allows for providing any desired time delay to the input motion received at first end 16 of the mechanical delay line. FIG. 1 further shows damping means 28 for predeterminedly damping the second end of the torsional mechanical delay line. This prevents the occurrence of reflected mechanical waves and thus improves the accuracy of the delayed output motion supplied by the mechanical delay line. Damping means 28 may comprise an enclosure containing a fluid such as oil and the like. A transducer 30 is coupled to the mechanical delay line near second end 18 for convening the delayed output motion supplied by the mechanical delay line to an electrical signal representative of the delayed output motion. Transducer 30 is generally in a respective inactive state to reduce the power consumption of the shock detector. Rod 24 is conveniently mounted on suitable bearings 32 to rotate in response to input motion along input axis 14. A torsional mechanical delay line is preferred because of its substantial lack of sensitivity to cross-axis inputs, i.e., it is desirable that a given mechanical delay line be substantially responsive to acceleration along any desired input motion axis (e.g., axis 14) and not along other axes that are mutually orthogonal to the desired input axis in a given mechanical delay line.

FIG. 2 shows a plan schematic view of torsional mechanical delay line 10 that best shows the relative alignment between cross-bars 26 and rod 24. As suggested above, cross-bars 26 allow to suitably select the delay time provided by mechanical delay line 10.

Figure 3:
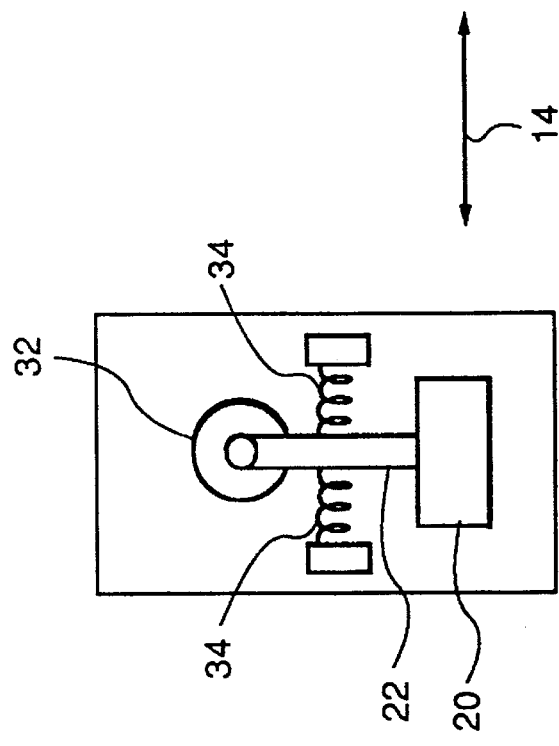
FIG. 3 is a plan schematic view of the torsional mechanical delay line shown in FIG. 1.

FIG. 3 is an elevation schematic view for torsional mechanical delay line 10 that shows springs 34 which serve to restore connecting arm 22 and in turn rod 24 to an original position after input motion is sensed along input axis 14.

Figure 4:
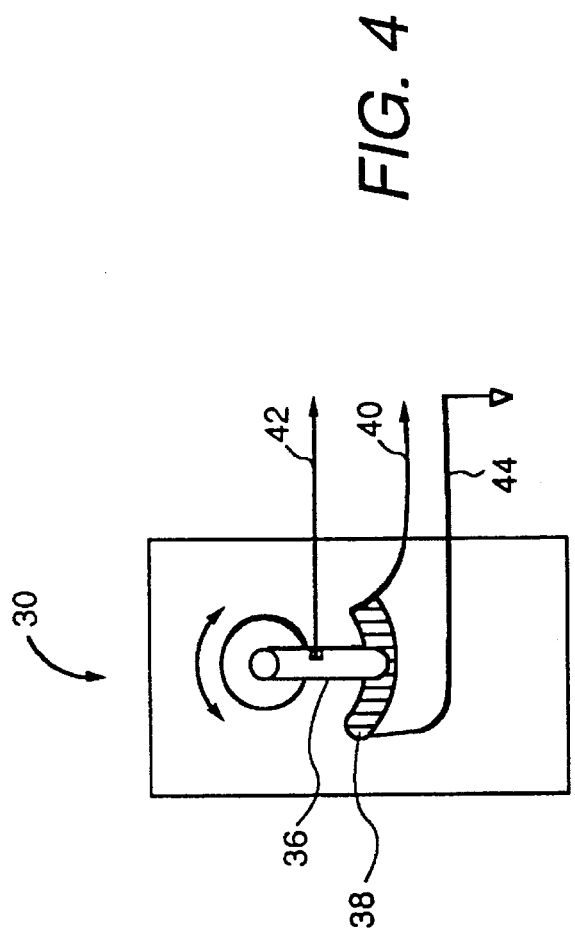
FIG. 4 is a schematic for the exemplary transducer shown in FIG. 1.

FIG. 4 shows an exemplary embodiment for transducer 30. In this embodiment, transducer 30 comprises a potentiometer having a wiper arm 36 mechanically connected to rod 24 (FIG. 1). Wiper arm 36 is electrically connected to a wire resistance 38 so that a voltage signal applied via an input lead 40 is suitably scaled by wire resistance 38 in response to the delayed mechanical motion supplied by the mechanical delay line. The scaled voltage signal can be supplied via output lead 42 to a suitable storage or recording device (not shown). Ground lead 44 conveniently provides an electrical ground to the potentiometer. It will be appreciated that the voltage signal supplied via input lead 40 need not be supplied continuously to the potentiometer, i.e., the potentiometer and associated storage device do not need to be continuously activated or turned-on, as will be explained shortly hereafter. It will be appreciated by those skilled in the art that there may be many alternative ways of converting the delayed mechanical motion to a suitable electrical signal. For example, a variable capacitor, such as a capacitor whose capacitance can be varied by rotating or moving one set of metal plates with respect to another set of plates, could be employed equally effective in lieu of a potentiometer.

In general, if motion sensing means, such as a relatively low-power (e.g., on the order of 1 mW or less) shock sensor or accelerometer, (FIGS. 6A and 6B) is provided for switching the transducer to a respective active state in response to the input motion, this would allow the shock detector to substantially measure any intermittent shock event regardless of the generally inactive state of the transducer. Further, if desired, a relatively high accuracy accelerometer (as described in the context of FIG. 7) could be activated by any such low-power motion sensing means thus allowing for improved accuracy and reduced power consumption in the improved shock detector. For example, a relatively high accuracy accelerometer may consume on the order of 50 mW or more of electrical power, and thus, by way of example and not of limitation, the improved shock detector of the present invention can readily provide savings in power consumption by a factor of about 50 or more over a shock detector which is operated continuously. In operation, the use of a mechanical delay line advantageously allows for measuring the shock event in its entirety. For example, any initial portion of the shock event, is readily measurable and will not go undetected even if the transducer and accelerometer are generally maintained in an inactive state in order to save power.

Figure 5:
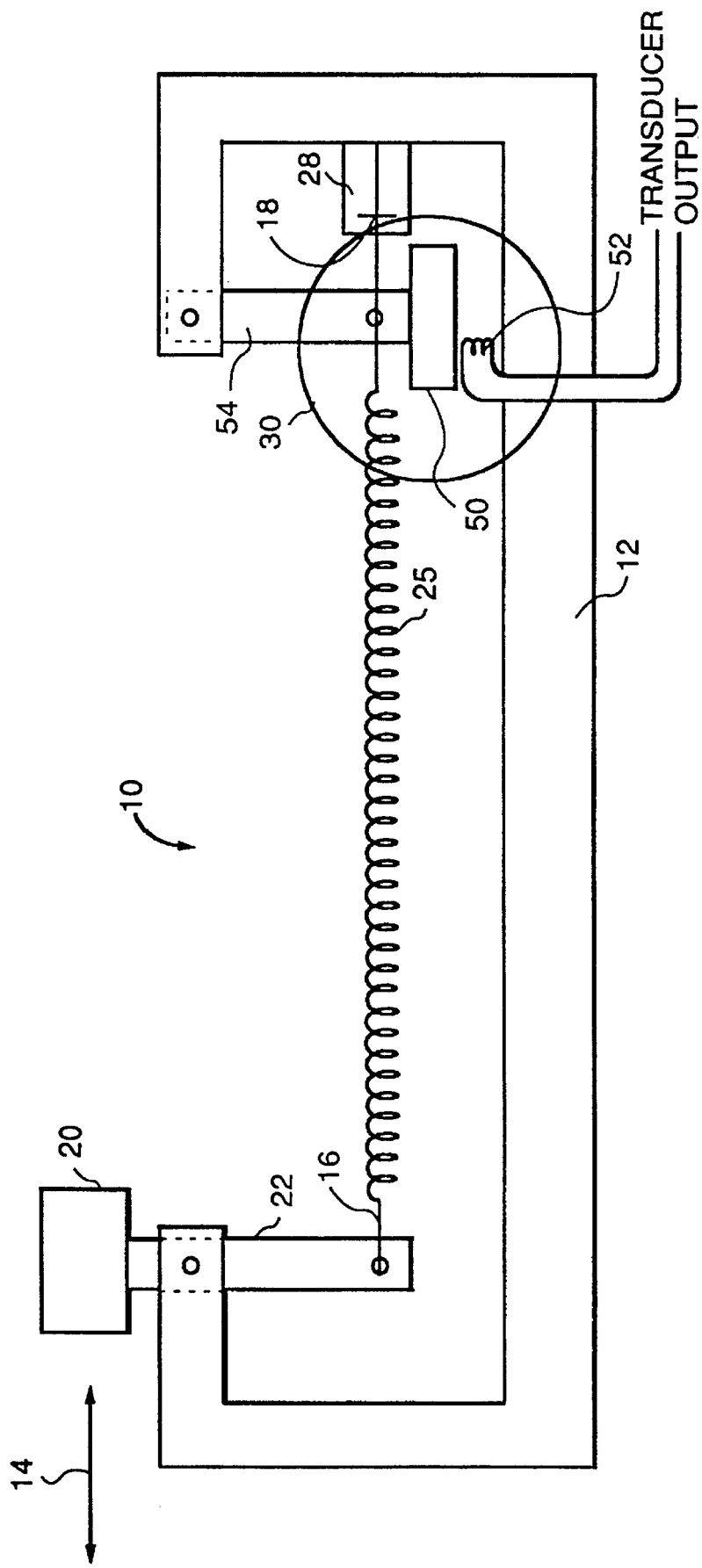
FIG. 5 is a side schematic view of a spring mechanical delay line in accordance with another embodiment of the present invention.

FIG. 5 shows another exemplary embodiment for the mechanical delay line that comprises a spring 25 having first and second opposite ends 16 and 18 positioned substantially along input motion axis 14. Similar to the mechanical torsional line described in the context of FIGS. 1–3, a spring mechanical delay line is another way of predeterminedly delaying any input motion along axis 14 so that transducer 30 converts the delayed motion into a suitable electrical signal. In this case, transducer 30 conveniently comprises an electromagnetic transducer made up of a magnet 50 attached near second end 18 to spring 25 via a suitable magnet connecting arm 54. A coil 52 is magnetically coupled to magnet 50 to produce an electrical signal which represents the delayed motion propagated through spring 25. Again, the second end of the spring is attached to a mechanical damper 28, such as a dashpot mechanical damper and the like, to avoid reflection of mechanical waves in the mechanical delay line. It will be appreciated that other alternative implementations are feasible for the mechanical delay line. For example, a tube having a predetermined length can be filled with a material having a predetermined compression wave velocity suitable to slow down or delay any compression waves propagating therethrough. Suitable materials include compressible fluids, such as air, water, oil and the like. A gelatin material can also be employed to fill the tube for the mechanical delay line.

Figure 6B:
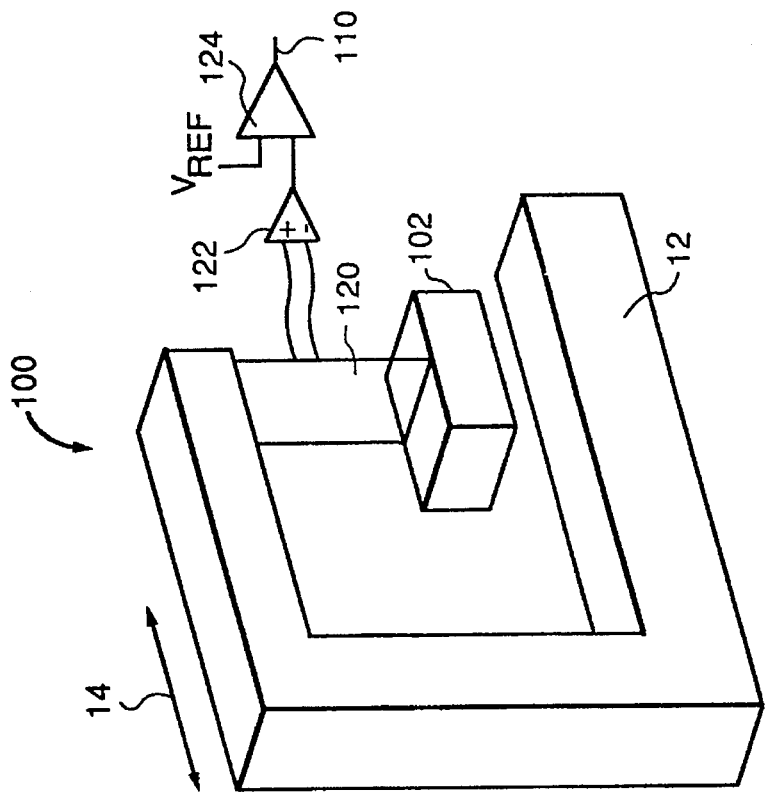
FIG. 6B is a schematic for another exemplary motion sensing means in accordance with the present invention.
Figure 6A:
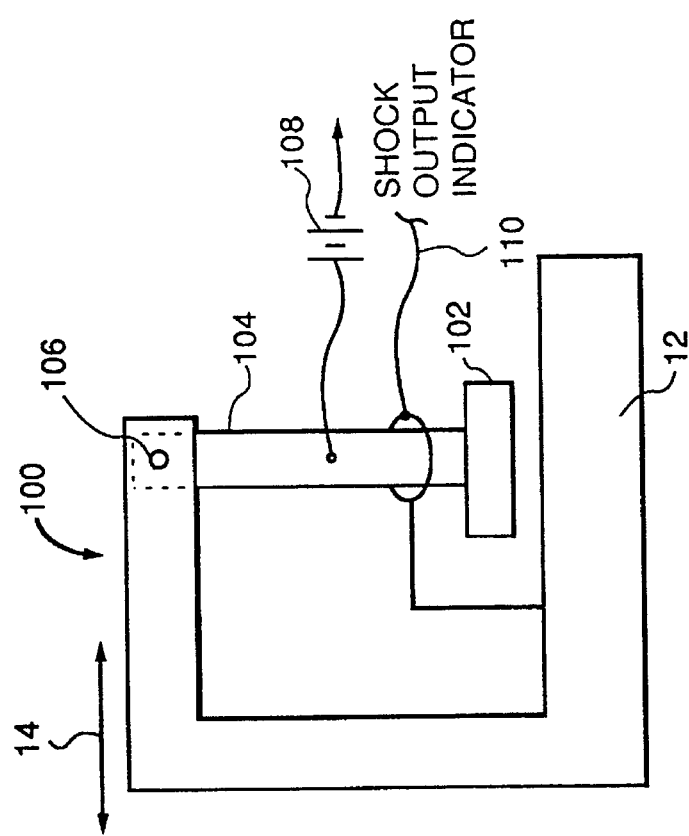
FIG. 6A is a schematic for one exemplary motion sensing means in accordance with the present invention.

FIGS. 6A and 6B show respective relatively low-power motion sensing means 100 which can be used for activating or enabling transducer 30 in response to the input motion along input axis 14. FIG. 6A comprises a low-power motion sensor similar to motion sensors employed in pinball machines for detecting a "tilt" condition, that is, a switch responsive to a mechanical tilt input. An inertial mass 102 is connected to a pivot arm 104 which pivots in response to a mechanical tilt input about pivot point 106 in response to input motion along input axis 14 and causes pivot arm 104 to complete an electrical circuit between an electrical source 108 and an output lead 110. In this manner, the voltage signal supplied at output lead 110 can be conveniently used to enable transducer 30 and any optional high-accuracy accelerometer (FIG. 7), as discussed above. FIG. 6B, shows another exemplary implementation for motion sensing means 100, such as a relatively low power accelerometer. In this case a piezoelectric film 120 when deflected due to input motion along input axis 14 produces an electrical signal which is amplified by a suitable operational amplifier 122, such as CMOS low-power operational amplifier. A comparator 124 can be conveniently employed so that an output signal is supplied by comparator 124 only when the level of motion, such as shock or acceleration, is above a predetermined level. In operation, when input motion is detected by motion sensing means 100, then power is provided to the accurate accelerometer and to transducer 30, both of which had been previously unpowered. After a relatively short period of time both the accelerometer and the transducer supply respective output signals which measure the shock event. For example, an output signal from transducer 30 can be recorded for a period of time approximately equal to the time delay imparted by the mechanical delay line. An output signal from the accelerometer can be recorded until the shock event has been characterized to the extent desired by the user. The output signal from the transducer, after suitable scaling, can be prefixed to the accelerometer output-signal and in this manner the shock event can be measured in its entirety notwithstanding that both the transducer and the accelerometer are generally inactive or turned off to save power. Once a shock event has been measured, power can be shut off from transducer 30 and from any high-accuracy accelerometer, except the motion sensing means 100 which, as suggested above, consume substantially less power than either the transducer and/or any high accuracy accelerometer employed in the shock detector.

Figure 7:
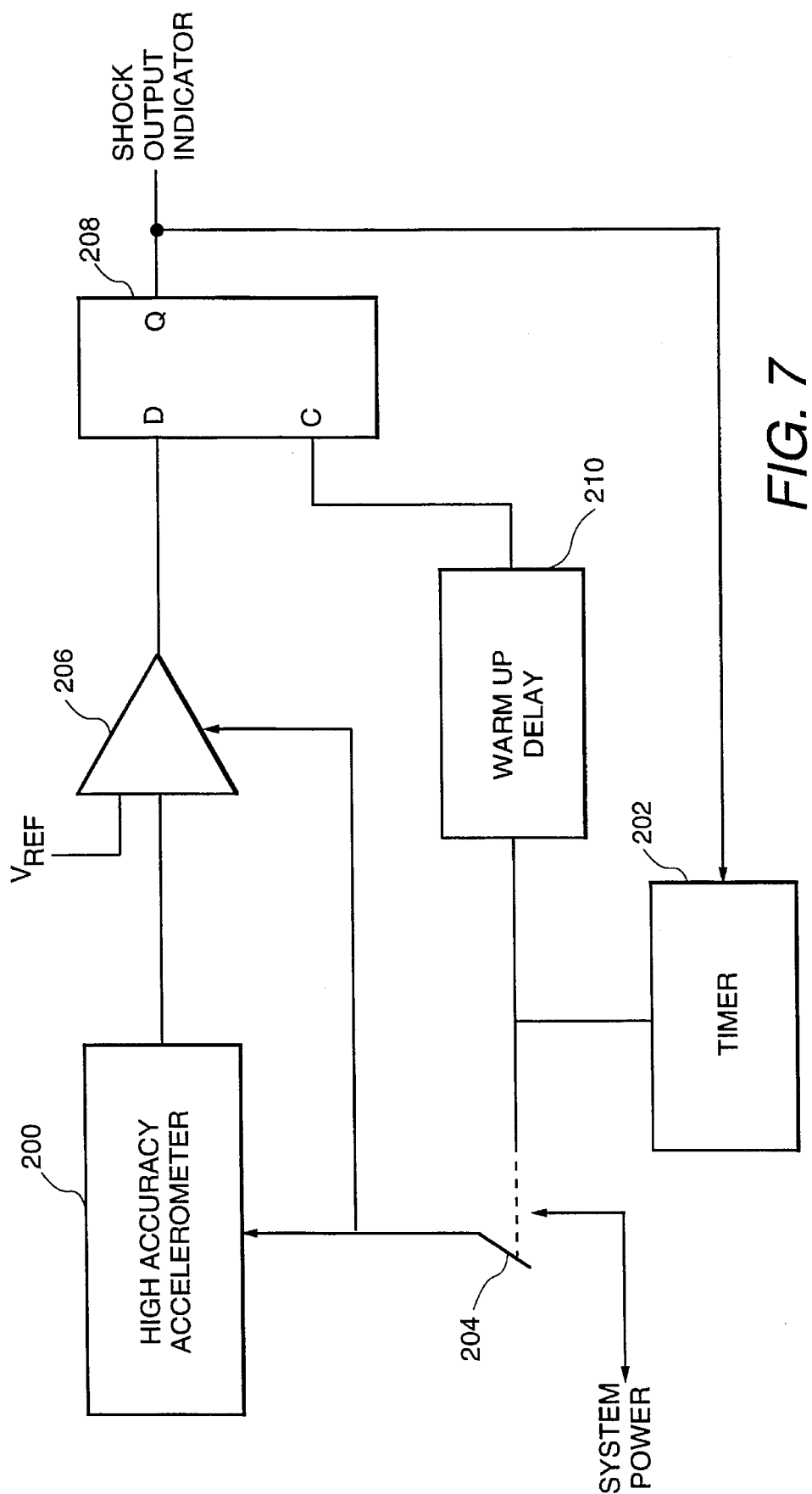
FIG. 7 is a block diagram schematic of an accelerometer capable of measuring acceleration with a relatively high level of accuracy including an exemplary timer in accordance with another embodiment of the present invention.

FIG. 7 illustrates another embodiment for the present invention, which employs a relatively high-accuracy accelerometer 200 capable of producing a substantially accurate output signal after a predetermined stabilization or warm-up time passes upon the accelerometer being turned on. As used herein, the expression "relatively high-accuracy accelerometer" refers to an accelerometer having higher accuracy and hence higher power requirements as compared to other low-power motion sensors, part of the improved shock detector. By way of example and not of limitation, accelerometer 200 may comprise a single monolithic IC, such as accelerometer model ADXL50, available from Analog Devices, Norwood Mass. Similarly, 7170 series accelerometers, available from Silicon Microstructures, Freemont, Calif. As previously suggested, one way of reducing power consumption is for accelerometer 200 to be generally inactive and then to be activated by a signal produced by a relatively low-power motion sensing device (FIGS. 6A and 6B).

Another way of reducing power consumption is for the accelerometer to be periodically activated at a predetermined rate for a relatively small duty cycle or duty factor compared to the delay time. For example, if the mechanical delay line has a delay time of 100 ms, then the predetermined rate can be conveniently selected as 10 Hz, and the duty cycle as 1 ms, that is, the accelerometer can be activated every 100 ms for a time interval of 1 ms. A timer 202 is coupled to accelerometer 200 for activating the accelerometer at the predetermined rate. Timer 202 allows a switch 204, represented as a mechanical switch but in actual practice preferably being an electronic switch, to supply system power to accelerometer 200 and to a comparator 206. A flip-flop unit 208, such as a CMOS flip-flop, receives the output signal from comparator 206. The output signal from comparator 206 causes flip-flop 208 to reach one of two states which can be respectively used for controlling operation of timer 202. A delay unit 210 is coupled to the "clear" input port of flip-flop 208. The delay unit preferably has a delay corresponding to the warm-up or stabilization time required by accelerometer 200 to start supplying an accurate acceleration output signal. In operation, when the accelerometer is activated, if a shock event is not in progress, comparator 206 supplies a low-level signal which is latched by flip-flop 208 and causes flip-flop 208 to be in a "zero" state. In this case, timer 202 shuts off accelerometer 200 and comparator 206 for the next 99 ms, for example, until the accelerometer is activated again by timer 202. If a shock event is in progress, comparator 206 supplies a high-level signal which is latched by flip-flop 208 and causes flip-flop 208 to be in a "one" state. In this case timer 202 does not shut off the accelerometer which remains turned on together with the transducer for the duration of the shock event. Thus, timer 202 can be readily employed for switching the transducer to a respective active state. The output signal from the transducer, after suitable scaling, can be prefixed to the accelerometer output signal and in this manner the shock event can be measured in its entirety notwithstanding than the accelerometer is only turned on intermittently.

While only certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A power-conserving shock detector for measuring shock events, comprising;

a mechanical delay line to supply delayed output motion in response to input motion along a predetermined input motion axis;

a transducer mechanically coupled to said mechanical delay line for converting the delayed output motion to an electrical output signal representative of said delayed motion, said transducer being generally in a respective inactive state to reduce the power consumption of said shock detector;

an accelerometer to produce a substantially accurate acceleration output signal after a predetermined stabilization time passes upon said accelerometer being turned on, said accelerometer being periodically activated to have a predetermined duty cycle sufficient to further reduce power consumption therein; and a timer for producing an output signal at periodic intervals, said timer being coupled to said accelerometer for activating said accelerometer in accordance with said duty cycle and for switching said transducer to a respective active state thereby allowing said transducer to measure at least an initial portion of the shock event and allowing said accelerometer to accurately measure any remaining portion of the shock event.

2. The shock detector of claim 1 wherein said mechanical delay line comprises a torsional mechanical delay line having opposite first and second ends positioned substantially perpendicular to said predetermined input motion axis.

3. The shock detector of claim 2 wherein said torsional mechanical delay line further comprises a connecting arm attached to said first end, said connecting arm having a predetermined inertial mass attached thereto.

4. The shock detector of claim 2 further comprising damping means for damping motion of said second end of said torsional mechanical delay line.

5. The shock detector of claim 2 wherein said transducer comprises a potentiometer.

6. The shock detector of claim 2 wherein said transducer comprises an electromagnetic transducer.

7. The shock detector of claim 1 wherein said mechanical delay line comprises spring means having first and second ends substantially positioned along said predetermined input motion axis.

8. The shock detector of claim 7 wherein said spring means further comprises a connecting arm attached to said first end, said connecting arm having a predetermined inertial mass attached thereto.

9. The shock detector of claim 8 further comprising damping means for damping motion of said second end of said spring means.

10. The shock detector of claim 1 wherein said mechanical delay line comprises a material having a predetermined compression wave propagation velocity, said material being selected from the group consisting of compressible fluid and gelatin materials.

* * * * *